US010339542B2

(12) United States Patent
Cicchitto et al.

(10) Patent No.: US 10,339,542 B2
(45) Date of Patent: Jul. 2, 2019

(54) STORE INTELLIGENCE—IN-STORE ANALYTICS

(71) Applicant: AVATIER CORPORATION, San Ramon, CA (US)

(72) Inventors: Nelson A. Cicchitto, San Ramon, CA (US); Christopher W. Arnold, San Ramon, CA (US); Anthony R. T. Simmons, Concord, CA (US)

(73) Assignee: Avatier Corporation, Pleasanton, CA (US)

(*) Notice: Subject to any disclaimer, the term of this patent is extended or adjusted under 35 U.S.C. 154(b) by 354 days.

(21) Appl. No.: 14/188,469

(22) Filed: Feb. 24, 2014

(65) Prior Publication Data
US 2014/0249883 A1 Sep. 4, 2014

Related U.S. Application Data

(60) Provisional application No. 61/768,331, filed on Feb. 22, 2013.

(51) Int. Cl.
G06Q 10/00 (2012.01)
G06Q 30/02 (2012.01)
(52) U.S. Cl.
CPC .................... G06Q 30/02 (2013.01)
(58) Field of Classification Search
CPC combination set(s) only.
See application file for complete search history.

(56) References Cited

U.S. PATENT DOCUMENTS

| 6,151,582 | A | * | 11/2000 | Huang | G06Q 10/06 705/7.25 |
| 7,376,969 | B1 | * | 5/2008 | Njemanze | G06F 21/55 709/224 |
| 7,917,412 | B1 | * | 3/2011 | Wang | G06Q 10/10 705/31 |
| 8,065,342 | B1 | * | 11/2011 | Borg | G06Q 10/06 455/456.1 |
| 8,355,337 | B2 | * | 1/2013 | Raleigh | G06Q 10/06375 370/252 |
| 2003/0009455 | A1 | * | 1/2003 | Carlson | G06F 8/36 |
| 2003/0046282 | A1 | * | 3/2003 | Carlson | G06F 8/36 |
| 2003/0144868 | A1 | * | 7/2003 | MacIntyre | G06F 17/30536 705/7.38 |
| 2004/0024644 | A1 | * | 2/2004 | Gui | G06Q 10/08 705/22 |
| 2004/0093559 | A1 | * | 5/2004 | Amaru | G06F 17/30604 715/210 |

(Continued)

OTHER PUBLICATIONS

"The use of Google Apps for implementing BI applications", O Ghadban Pou—2010—upcommons.upc.edu.*

(Continued)

Primary Examiner — Jonathan G Sterrett
(74) Attorney, Agent, or Firm — Michael A. Glenn; Perkins Coie LLP

(57) ABSTRACT

Store intelligence—in-store analytics ("in-store analytics") techniques are provided that, by combining analytics with experience, improve the shopping, managing, monitoring, etc., experience of an end user. In-store analytics can be integrated with workflow for optimizing and assisting prioritizing operations.

11 Claims, 9 Drawing Sheets (ITEMS)

(56) References Cited

U.S. PATENT DOCUMENTS

| | | | |
|---|---|---|---|
| 2004/0138933 A1* | 7/2004 | LaComb | G06Q 10/06311 705/7.13 |
| 2004/0199430 A1* | 10/2004 | Hsieh | G06Q 30/02 705/26.62 |
| 2006/0064429 A1* | 3/2006 | Yao | G06Q 30/02 |
| 2006/0085255 A1* | 4/2006 | Hastings | G06Q 30/02 705/14.4 |
| 2006/0184932 A1* | 8/2006 | Burnley | G06F 8/60 717/174 |
| 2006/0265751 A1* | 11/2006 | Cosquer | H04L 63/1441 726/25 |
| 2007/0005477 A1* | 1/2007 | McAtamney | G06F 3/04845 705/35 |
| 2007/0113287 A1* | 5/2007 | Blumenau | G06F 17/30082 726/26 |
| 2007/0156505 A1* | 7/2007 | Agassi | G06Q 10/0637 705/14.41 |
| 2007/0192338 A1* | 8/2007 | Maier | G06F 17/30722 |
| 2008/0086363 A1* | 4/2008 | Kass | G06Q 10/04 705/7.29 |
| 2008/0294996 A1* | 11/2008 | Hunt | G06Q 30/02 715/739 |
| 2009/0204517 A1* | 8/2009 | Edens | G06Q 10/06 705/30 |
| 2009/0299779 A1* | 12/2009 | Ettl | G06Q 10/087 705/28 |
| 2009/0319931 A1* | 12/2009 | Hutchings | G06F 3/0481 715/771 |
| 2010/0095235 A1* | 4/2010 | Bennett | G06Q 99/00 715/781 |
| 2010/0100250 A1* | 4/2010 | Budhraja | H02J 3/008 700/291 |
| 2010/0121677 A1* | 5/2010 | An | G06Q 10/04 705/28 |
| 2011/0050423 A1* | 3/2011 | Cova | G06Q 10/08 340/572.1 |
| 2011/0261049 A1* | 10/2011 | Cardno | G06Q 10/10 345/419 |
| 2011/0282508 A1* | 11/2011 | Goutard | H04L 63/20 700/293 |
| 2012/0166279 A1* | 6/2012 | Collins | G06Q 20/12 705/14.53 |
| 2012/0173393 A1* | 7/2012 | Acuff | G06Q 10/087 705/28 |
| 2012/0265701 A1* | 10/2012 | Thomas | G06Q 30/02 705/310 |
| 2012/0272265 A1* | 10/2012 | Flatt | G06Q 30/0251 725/34 |
| 2013/0041837 A1* | 2/2013 | Dempski | G06Q 10/101 705/345 |
| 2013/0246147 A1* | 9/2013 | Chen | G06Q 30/0226 705/14.25 |
| 2013/0311437 A1* | 11/2013 | Stluka | G06F 17/30598 707/706 |
| 2014/0244325 A1* | 8/2014 | Cartwright | G06Q 10/0631 705/7.12 |
| 2014/0244429 A1* | 8/2014 | Clayton | G06Q 30/0631 705/26.7 |
| 2014/0249883 A1* | 9/2014 | Cicchitto | G06Q 30/02 705/7.25 |

OTHER PUBLICATIONS

"Whip: A framework for mashup development with block-based development approach", R Latih, AM Patel, AM Zin, T Yiqi . . .—Electrical Engineering . . . , 2011—ieeexplore.ieee.org.*

* cited by examiner (ITEMS)

(DAYS OLD)

(DAYS SINCE LAST REQUESTED)

(IN USE)

(IN USE - SHOWING THE USERS THAT HAVE THE ASSIGNED ITEM)

(TIMES REQUESTED)

(DENIALS)

(COMPLETION DAYS)

(RISK SCORE)

STORE INTELLIGENCE—IN-STORE ANALYTICS

CROSS REFERENCE TO RELATED APPLICATIONS

This patent application claims priority from U.S. provisional patent application Ser. No. 61/768,331, STORE INTELLIGENCE—IN-STORE ANALYTICS, filed Feb. 22, 2013, the entirety of which is incorporated herein by this reference thereto.

BACKGROUND OF THE INVENTION

Technical Field

This invention relates generally to the field of computation of and display of digital analytics regarding tracked and stored digital data. More specifically, this invention relates to providing computation of and display of digital analytics regarding tracked and stored digital data, such as for example store data.

Description of the Related Art

Online stores have become ubiquitous in today's economy and culture. Similarly, organizations have automated certain processes regarding certain assets. For example, an information technology (IT) specialist in an organization can deploy a software application remotely using internal servers. A librarian may use an online tool to manage the inventory of books at a given library. For these and other organizations that collect, store and provide assets, useful analytics and interactive capabilities that help to improve vastly an end user's overall experience in acquiring, monitoring, or managing the assets are sorely lacking or are very limited.

SUMMARY OF THE INVENTION

Store intelligence—in-store analytics ("in-store analytics") techniques are provided that, by combining analytics with experience, improve the shopping, managing, monitoring, etc., experience of an end user. In-store analytics can be integrated with workflow for optimizing and assisting prioritizing operations.

DETAILED DESCRIPTION OF THE INVENTION

Store intelligence—in-store analytics ("in-store analytics") techniques are provided that, by combining analytics with experience, improve the shopping, managing, monitoring, etc., experience of an end user. In-store analytics can be integrated with workflow for optimizing and assisting prioritizing operations.

In an embodiment, store intelligence—in-store analytics provides a way to change a given store on an automatic and/or interactive basis. For example, store intelligence allows a manager of a store to determine immediately in real-time that, based on the analytics, the store needs to change its inventory. In accordance with an embodiment, store intelligence—in-store analytics may be configured to have the store automatically perform a business process such as change itself based on the analytics, e.g. by automatically removing an item from a to-be-purchased list based on the analytics which indicate a poor performance in sales of the item.

It should be appreciated that for the purposes of understanding particular use-cases as depicted in the figures to follow are used as examples only and are not meant to be limiting. For example, while the discussion herein may refer to end user as a customer or even as a manager, it should be appreciated that such usages is not meant to be limiting. A store may be an end user.

An end user is meant to mean any entity, e.g. human or machine, that acts on the target item data and can interact with the target item data.

In an embodiment, in-store analytics may be used with or for but is not limited to self-service or self-service provisioning and management. For example, an embodiment may be applied to online mechanisms or enterprise platforms that may already exist, such as for example, Identity Enforcer, by Avatier in San Ramon, Calif. That is, in this example, in-store analytics can act on, interact with, or modify particular data from Identity Enforcer.

Figure 1:
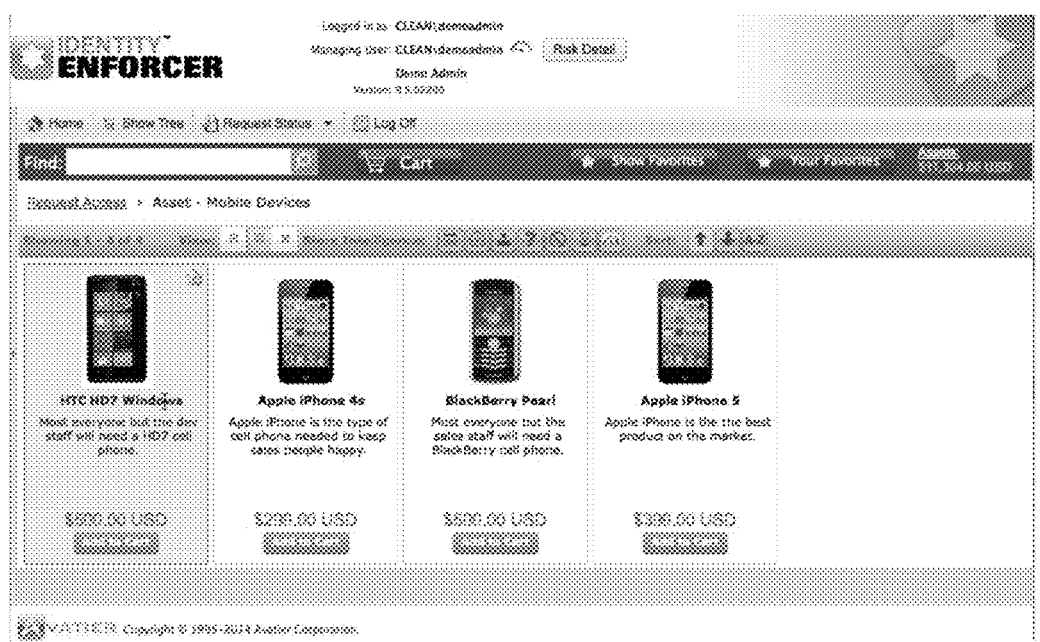
FIG. 1 is a screen shot showing a collection of a variety of mobile devices that are offered at a particular store, according to an embodiment of the invention.

An example embodiment may be understood with reference to FIG. 1, a store having mobile devices. It should be appreciated that such store is by way of example only and is not meant to be limiting.

FIG. 1 is an exemplary screenshot showing items of interest, such as for example, items available or of interest to a store, which may be an online store. FIG. 1 shows a collection of a variety of mobile devices that are offered at a particular store.

It should be appreciated that any collection of items of an interest to an end user may be contemplated in this discussion as well. For example, instead of store, an embodiment may include an entity of interest, such as but not limited to a secure site or application and instead of stored assets, e.g. items available at the store, an embodiment may include items such as representations of individual SAP accesses, Oracle accesses, active directory accesses, and the like. Other examples of an entity of interest include but are not limited to any item that can be requested or assigned to a target user and the item can be any virtual or physical item that can be assigned to one or more users.

As another example, in-store analytics may perform analytics on particular data and present results thereof in the context of auditing or compliance. For example, an auditor may be able to quickly determine whether particular items are available for purchase, have been purchased, are no longer being used, how many users per item, and so on.

In an embodiment, in-store analytics can perform the following but is not limited to these processes:
- counts the number of times the item has been issued;
- counts the number of times the item has been requested;
- counts the number of times a request for the item has been denied;
- calculates the item's age, e.g. how long the item has been in the store;
- calculates the average time to complete a request for said item;
- calculates the days since last requested;
- determines who was the last requester; and
- calculates a risk score for said item.

In an embodiment, the risk for an item is set using a weighted scale that allows a user to set the range at the container level or at the individual item level. The system takes into consideration if no score is defined at the item. It rolls up to the container level with an actual risk score associated. The risk score is used to determine if an item is riskier than and the other items. The items can grant levels of access to systems. An example is access to a financial system with the ability to write checks would be riskier than an item that allows a user to view the check. The associated risk score of the item is part of the overall users risk score. If the user has a number of items or more than usual this will increase the users overall risk in the environment.

In an embodiment, in-store analytics may be applied to third party stores, such as but not limited to Amazon or Sears or Target or any store, online or otherwise. To implement incorporating in-store analytics into a third party application, an embodiment adds GUI elements to the user interface of the third party application via HTML, CSS, and JavaScript changes. A back end web service is implemented to supply the metrics to in-store analytics engines and storage, and metrics can be computed therefrom, e.g. SQL can be used to calculate these metrics. An alternate implementation provides a particularly designed browser extension that augments the online store of the target site to collect, store, and include this information.

An embodiment provides a different way of displaying information, different from what already exists. What is displayed is not only the results of analytics, but the ability to drill-down to obtain any level of analytics desired. For example, each icon in FIG. 1 may be manually selected for drilling down to more detailed information about the item. For instance, a user, which may be an individual or a programmed processor, may select the iPhone 4 icon, obtain analytics or information about the iPhone 4 by drilling-down to another level of detail about the iPhone 4, and based on the analytics or information obtained, perform a specific task or operation. For example, a store may itself determine that it needs to order more iPhone 4s or a user may decide to decrease the order.

In an embodiment, the user finds the target item (iPhone 4 in this example) using an existing navigation system. Once the target item is on screen, the user selects the desired type of analytics metric, e.g. clicks on one of a plurality of store analytic buttons, e.g. how many days old. The requested data is displayed and the user is free to make decisions based on this data.

An embodiment provides end users, e.g. a customer, manager, or the store itself, a new way to look at items such as for example the way items are purchased, requested, how long they've been in the store, and popularity of an item. An embodiment provides all around analytics and interactive capabilities.

It should be appreciated that while the discussion herein is about online stores and related actions on items in stores, such as but not limited to purchasing, requesting, monitoring inventory, etc., such context is by way of example only.

Other applications are included in the scope of the subject matter, such as but not limited to managing books available in a library, for instance.

In an embodiment, relational databases are used to store the relevant data including but not limited to configuration data, customer data, end user data, data regarding the targeted items of the customers or end users, and items that are provided by the organization. The relational databases are in communication with analytic servers or engines and with user interface browsers and applications to achieve presenting results and views of the computed analytic data to the end user.

In an embodiment, the configuration data comprise the meta data configured for the different items or objects in the store. This is important information/data related to the access that they system is able to track and associate to a user and provide the analytics about what a user has and what their risk is within the environment. An embodiment provide granular data that is collected daily and processed to alert the system of what the user has assigned in the connected system versus what the system expects the user to have.

Figure 2:
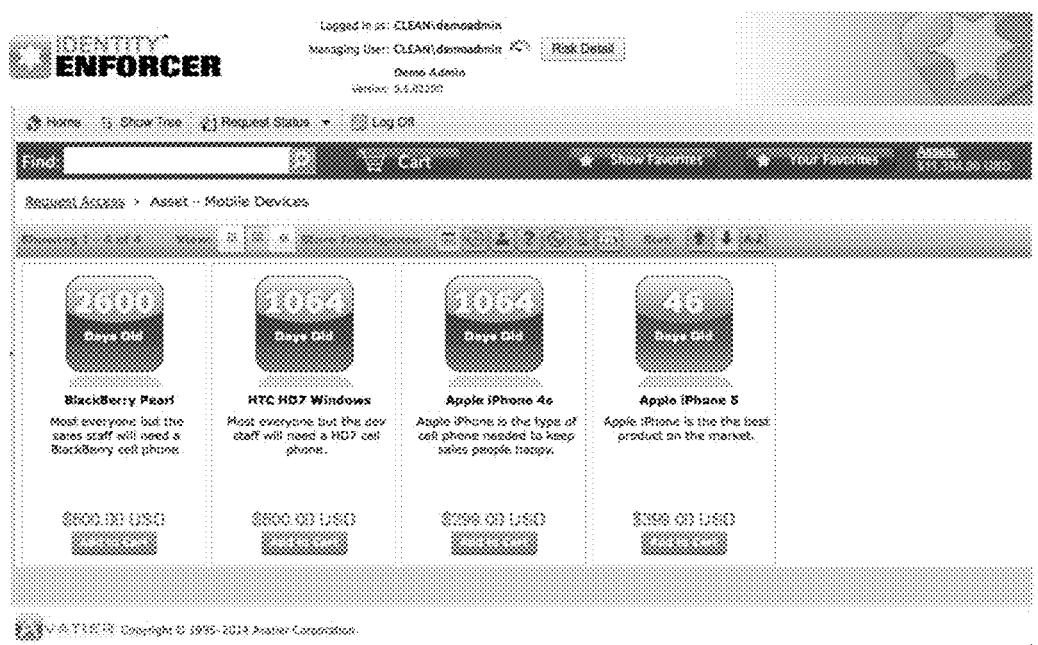
FIG. 2 is a screen shot showing how old the devices of FIG. 1 are, according to an embodiment of the invention.

An embodiment can be understood with reference to FIG. 2, a screenshot of the result of an end user viewing another drilling-down level, such as by double-clicking a particular item of FIG. 1. Thus, for example, FIG. 2 shows another level of detail of the items in a collection. As an example, FIG. 2 shows the mobile devices that are available in the store of FIG. 1. In particular, FIG. 2 shows how old the devices are, meaning how long ago such devices were put into the store. It should be appreciated that embodiments are not limited by the specific example but can determine and show other information about the items and based on such information are configured to allow a suitable action to be performed. For example, the system may determine that when an item is older than a number of days, it is removed from the store. As well, an application representing the store itself may be configured to remove such item from the store by removing the item from a particular list, or perform any other suitable operation, when the number of days is too old.

In an embodiment, a framework is provided that contains built-in tools that collect the data from connected systems via integration. For example, data and metadata about the target items can be stored and accessed; data and metadata about customers, e.g. customer profile data, can be stored and accessed; data and metadata about the organization can be stored and accessed, e.g. rules and constraints regarding processes the data, e.g. if an item is older than 25 days, remove the item, and so forth.

An embodiment performs any type of analytics of interest on data at the store, where such data may be stored or collected in real-time or both, and provides the results of such analytics in a variety of manners of interest to an end user, such as but not limited to displaying results in a display or storing such results in a storage. As well, part of this process is user configurable. That is customers are able to customize and configure part of this application to suit their business needs. For example, a customer can configure the application to change the target item's icon color to red when the target item is 25 days old. In an embodiment, a configurable interface and application is provided that allows a customer to configure the data, analytics, and display by using a superior point click GUI web based configuration application.

Figure 3:
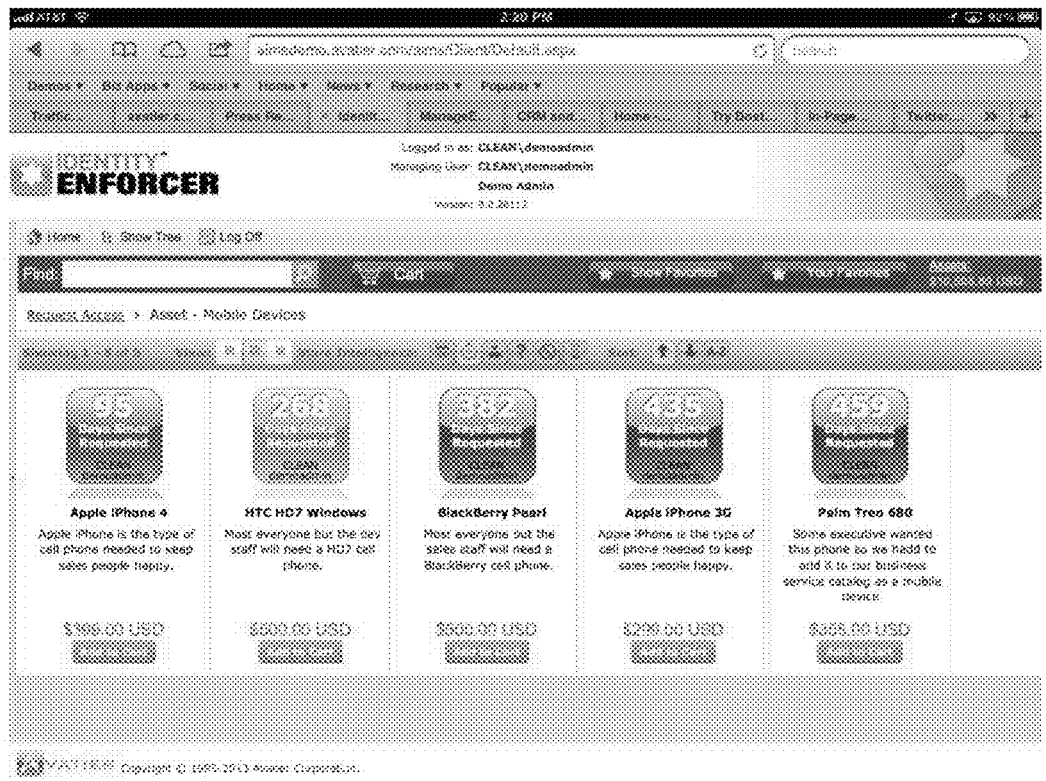
FIG. 3 is a screen shot showing the number of days since each particular item was last requested, according to an embodiment of the invention.

As another example, FIG. 3 shows the results of an embodiment performing analytics on the store data which are days since each particular item was last requested. It should be appreciated that an embodiment, for example any of the above-mentioned embodiments, provides an end user, such as a shopper, store manager, the store itself, etc., informational data reflecting that it has been awhile since anyone bought a particular item, such as for example, the iPhone 3. In this example, the end user can determine that the iPhone 4 is the most popular or relevant because it has the least number of days since requested. Then, the end user can add this item to the cart. As another example, a store manager can determine that it has been over a year, indeed, 459 days since the Palm Treo 680 was requested. Thus, the store manager may decide not to order any more Palm Treo 680s, for example. Thus, embodiments herein provide new and unexpected results including changing the whole shopping, managing, monitoring, etc., experience for a user such as a customer or manager that is not currently present in the market or otherwise, because the user is provided with much more meaningful data with which to make better decisions. The user can glean in an instant, with the assistance and enhancements of visual indicators, which target items are most popular, least popular, are the oldest, etc.

Figure 4A:
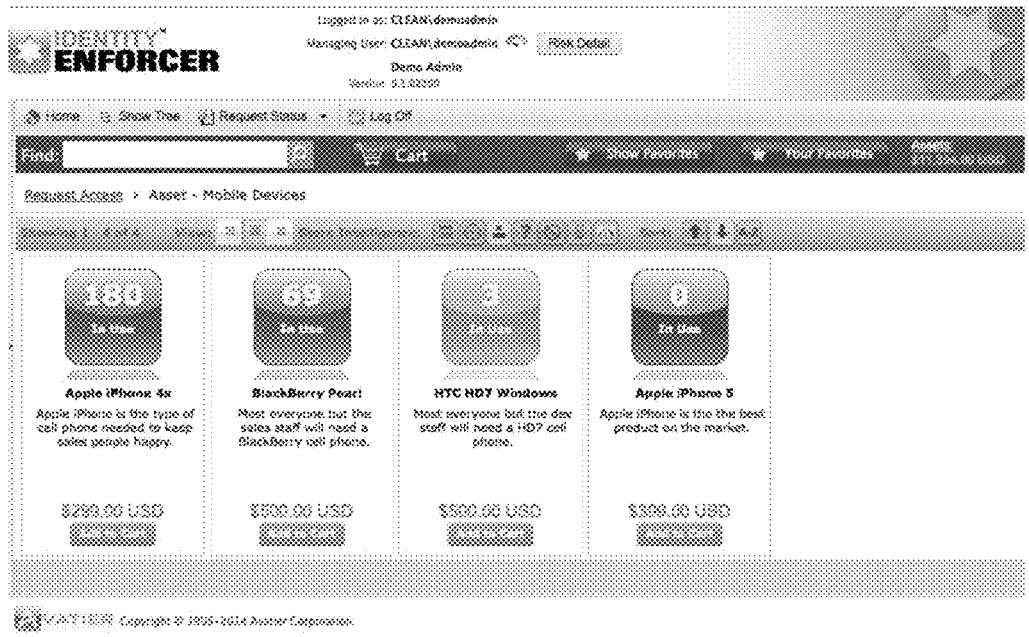
FIG. 4A-4B are screen shots showing how many particular items of the store are in use, according to an embodiment of the invention.
Figure 4B:
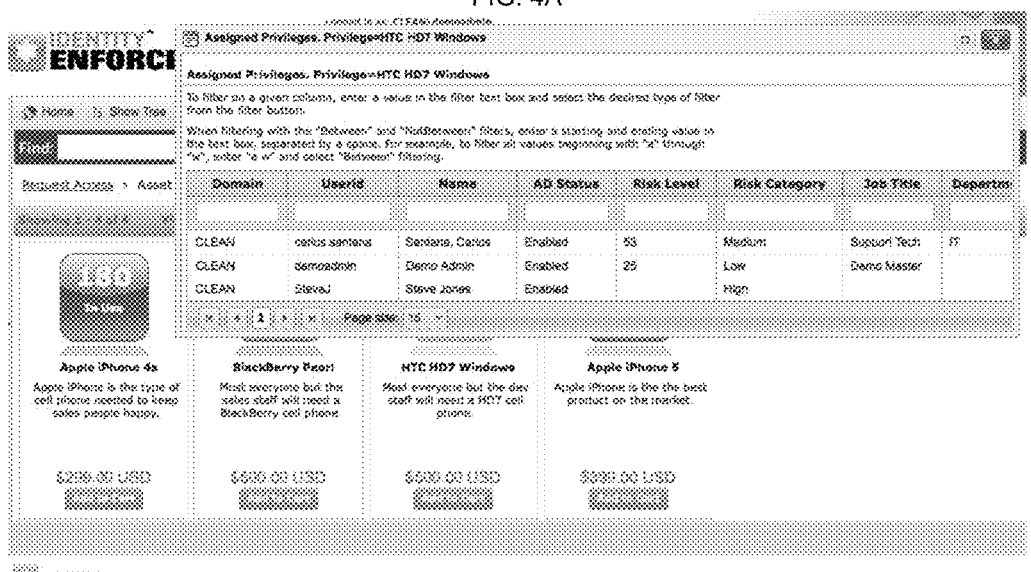

An embodiment applies analytics to store data and provides for the number of usages for each item, i.e. how many particular items are in use, for example by employees of an organization. An exemplary screenshot is shown in FIG. 4A. For example, an office manager or information technology (IT) employee can determine that 180 Apple iPhone 4s's are in use and that there are only three uses of HTC HD7 Windows. Thus, the IT employee may report back to management that employees use many more Apple iPhone 4s's than HTC HD7 Windows for example. From there, management can determine whether to continue to use their funds for both of these products or to get rid of HTC HD7 Windows and keep Apple iPhone 4s's. Or the data can be used in compliance and auditing processes as another example. FIG. 4B shows the users that have the assigned item. It should be appreciated that the risk levels of the users are also shown.

Figure 5:
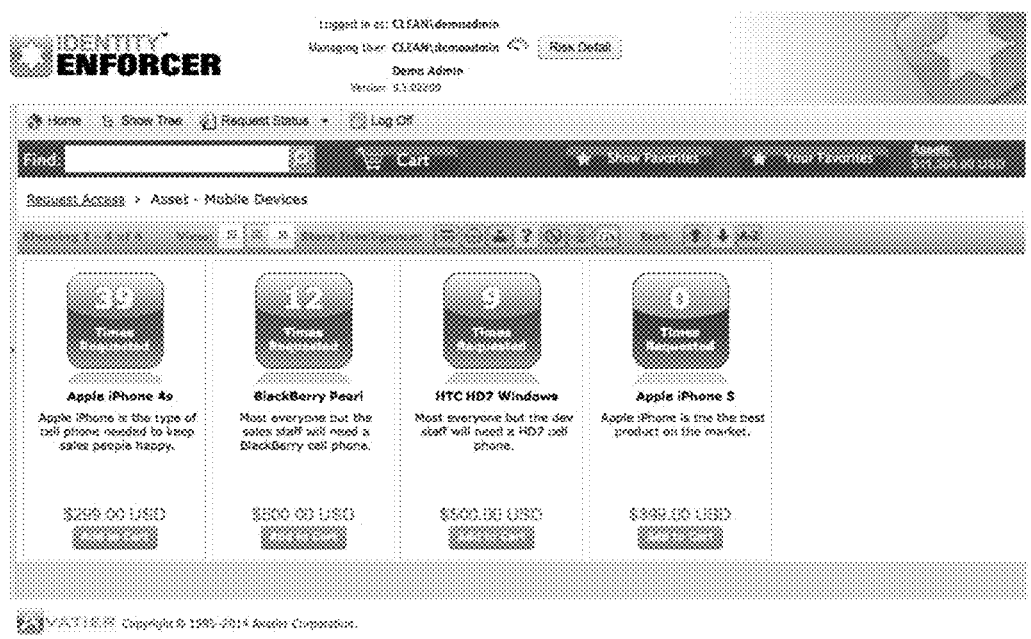
FIG. 5 is a screen shot showing how many times each item has been requested, according to an embodiment of the invention.

An embodiment applies analytics to store data and provides how many times a particular item has been requested, for example by customers of a store or by employees in an organization. An exemplary screenshot is shown in FIG. 5. For example, an end user viewing the sample screen shot as shown in FIG. 5 can determine that the Apple iPhone 4s was requested 39 times and the BlackBerry Pearl was requested 12 times. Then, the end user can make a decision based on that information accordingly. For example, perhaps the end user wants more of the BlackBerry Pearls to be in use. Then, based on the analytical information displayed in the screen shot, the end user can decide to take action to better promote the BlackBerry Pearl.

It should be appreciated that while analytics, which generate data about other individuals that have purchased a particular item, such as for example by Amazon.com, already exist in the market, determining and providing the more complete analytics herein including but not limited to how many times a particular item was purchased, as provided in embodiments herein, is not presently available in the market or in the prior art.

To achieve the results provided by the invention herein and as shown in the sample figures, an embodiment processes the input data, e.g. regarding age, times requested, times used, etc., and then based on the data and a particular configuration to give weighting and ranges to the data, the embodiment displays the data consistently and easily to the end user. An example of this is similar to the risk example above. A certain object has a perceived risk based on the score assigned to the item/container. The user making the decision to request the item needs to understand the risk associated to the item and how it may be perceived for their access. Another example is a user who wants to see the last time an object was requested. This would be useful to determine if the access to the object is really needed or wanted. Another example is how long the item typically takes for assignment This information provides the user a level expectation (SLA) of when they will be assigned the item and have the access required.

In an embodiment, the results of the analytics may be used either public-facing or for private purposes. For example, such data may be provided for store managers, even at a site such as Amazon.com, to obtain more detailed, accurate, timely, and more thorough statistics.

In an embodiment, one or more sorting algorithms are applied, either automatically or can be manually applied. For example, when sorting is automatic, an embodiment may put the number of items in order by times requested. The sort may be from least number of times to greatest number of times or vice-versa. For example, the end user may want to view the items by least number of times requested at the top of the list, etc. It should be appreciated that for purposes of understanding herein, the number of times requested may not mean the number of times purchased. For example, the number of times requested may be greater than the number of times actually purchased. For example, a customer may request an item but may have been denied the item.

In an embodiment, the configuration offers modes for sorting and then from an end user GUI capability the end users are able to sort the data analytics to provide the correct and desired sorting. The modes may include but are not limited to the bulleted list of counts and calculations herein above.

In an embodiment, visual indicators may be used to show an order or particular importance to an item or one or more collections of items. For example, in the context of mobile devices, when the number of purchases of mobile devices from a particular vendor passes a particular threshold, the color of the icon representing the mobile devices may change. For example, when the number of purchases of iPhone 4s passes beyond 50, then the icon representing iPhone 4 may change from grey to green. As another example, when a particular request to purchase a mobile device is denied, the color of the icon representing such mobile device may change from blue to red. As another example, in the context of security and access, when an particular item is not used or accessed, it may have an orange color, for example. Or, as another example, by observing the color, an end user, such as a manager, may determine that his collections of iPhone 2s are not being used. It should be appreciated that the use of the color indicator is by way of example only and is not mean to be limiting. Other indicators, such as a specially marked number of pixels, such as a visual tag, at a top corner of an icon may be used as an particular indicator.

In an embodiment, the items available for display to the end user and the configuration settings include but are not limited to:

Item Age;
Last Request;
Current Assignment Count;
Request Count;
Denial Count;
Average Request Days; and
Risk Score.

In an embodiment, the indicators available for display to the end user and the configuration settings include but are not limited to:
Metric;
Type (Static, Percent);
Color Bands (Red, Yellow, Green);
Range End;
Default Sort (Descending, Ascending); and
Reverse.

In an embodiment, the configuration allows the administrator to setup the different scales and what indicators are available. The end user can select the view or metric they want to see and select the sorting order.

As another example of a visual indicator, using or overlaying a special icon, such as a well-known stop sign, may be used to indicate that an end user may not have access to a particular service or product or that no more products of a particular type are available.

As another example of an indicator, it should be appreciated that audible indicators may be used. For example, when an end user desires to select an item to determine how many users have access to it, a particular alert sound may be played to indicate that there are no more items of that kind or that the items available are below a threshold, etc.

Figure 6:
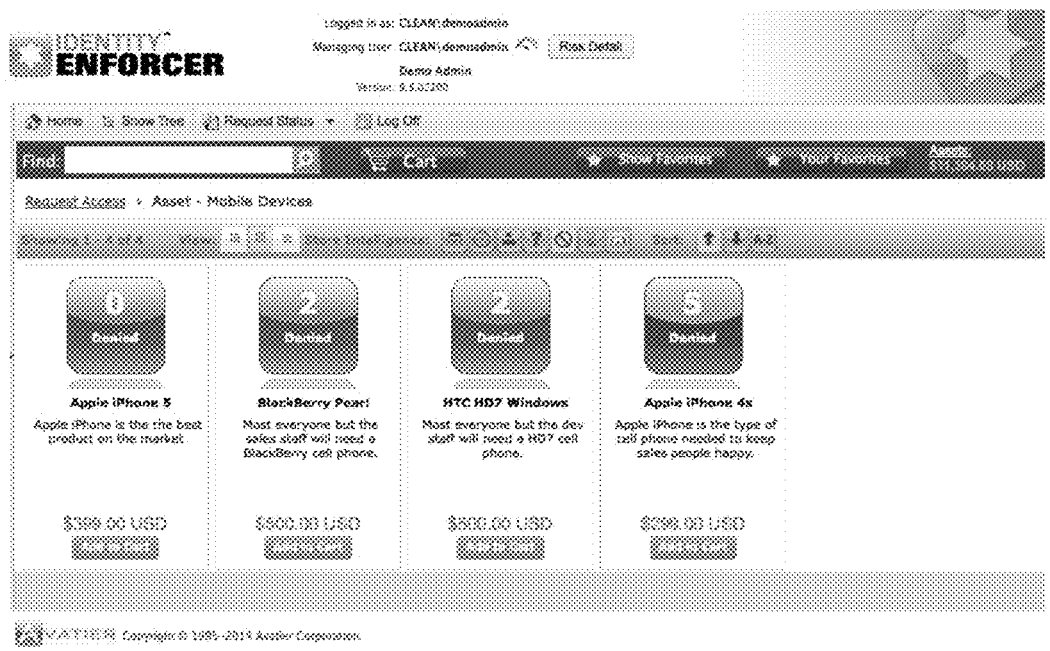
FIG. 6 is a screen shot showing how many times each item was denied, according to an embodiment of the invention.

An embodiment may provide how many times items were denied. An exemplary screenshot is provided in FIG. 6. For example, from a store point of view, in-store analytics may determine and present what items are constantly getting credit card denials or things of that nature. In FIG. 6, a store manager can see that the first three items were denied only a small number of times, especially because their color icon is green. The store manager can quickly determine that the last item was denied an excessive number of times, because its icon color is red. Indeed, the first three items were denied 0, 2, and 2 times, respectively. The last item was denied five times.

An embodiment allows integrating in-store analytics with workflow. For example, an embodiment pertains to workflow by giving people access in a corporate environment. An embodiment provides one or more tools in a broad range of contexts, such as for example, being are part of an IT store with mobile devices or also in an SAP environment provisioning SAP access or Oracle access or active directory, etc. In an embodiment, the computed analytical data shows or otherwise indicates how an object was processed. This data enables users to understand how long an item takes to get, who has the item, how many times the item was requested, and so on. All and any of this data is useful to different end users based on their respective role in an organization.

Figure 7:
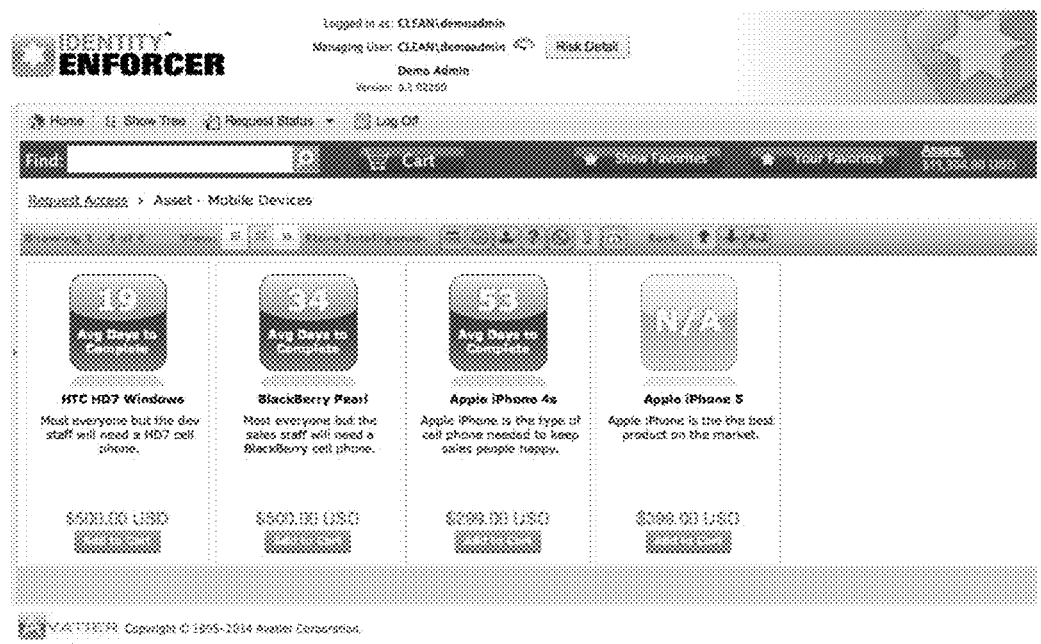
FIG. 7 is a screen shot showing the average number of days to complete a process regarding each item, according to an embodiment of the invention.

An embodiment may be understood with reference to FIG. 7, which shows an exemplary screen shot of average number of days to complete a process regarding the item. For example, an embodiment may determine and present that some items may take longer than others for management to approve. In the embodiment, the configuration is based on weights and scales of the items. Each item has a sliding scale to determine where it is on the spectrum. Again referencing the high risk item, one can set the item to have a 90 rating which based on a scale of 1-100, would be considered a high risk item. As another example, one item may be less valuable than another item. Thus, the less valuable item may be given a weight of 25 percent while the more valuable item may be given a weight of 75 percent. As another example, the color of the icon of the first item can turn red when the average number of days to complete passes the threshold of 10 days, whereas the color of the icon of the second item can turn red when the average number of days to complete passes the threshold of 25 days. The Apple iPhone 5 shows not applicable (N/A) and the color of the icon is grey, which is a result due to a particular rule setting.

Thus, when an embodiment is integrated with a workflow, for example of an organization, an end user, such as a manager or executive, may sit down and look at those workflows, e.g. the approval processes, and start to optimize his or her approval processes based on the computed and displayed analytical results. Alternatively, the computed analytical results can be used in an automated workflow to automate approval processes regarding particular data, purchasing processes regarding particular data, and other decision making processes regarding particular data, thereby providing optimization and prioritization in these workflow processes. As an example, user A who owns a section of the store can visit the store and determine if the item needs to be available based on requests, assignment, last request, etc. An end user or manager can determine if he or a direct report needs the item based on others that have the item.

In an embodiment, the optimization may be performed automatically, for example, by ingesting the data provided by the in-store analytics, performing particular analytics, and performing various optimization algorithms or rules based on such analytics. In an embodiment, a risk configuration is collapsed and weighted and then assigned to an item in the store. The risk then is associated to a user. That is, similar to the example above, the risk associated gives the user an idea of what the risk is. From an overall user risk score, that data is collapsed which provides an overall risk score for the item and the user.

Figure 8:
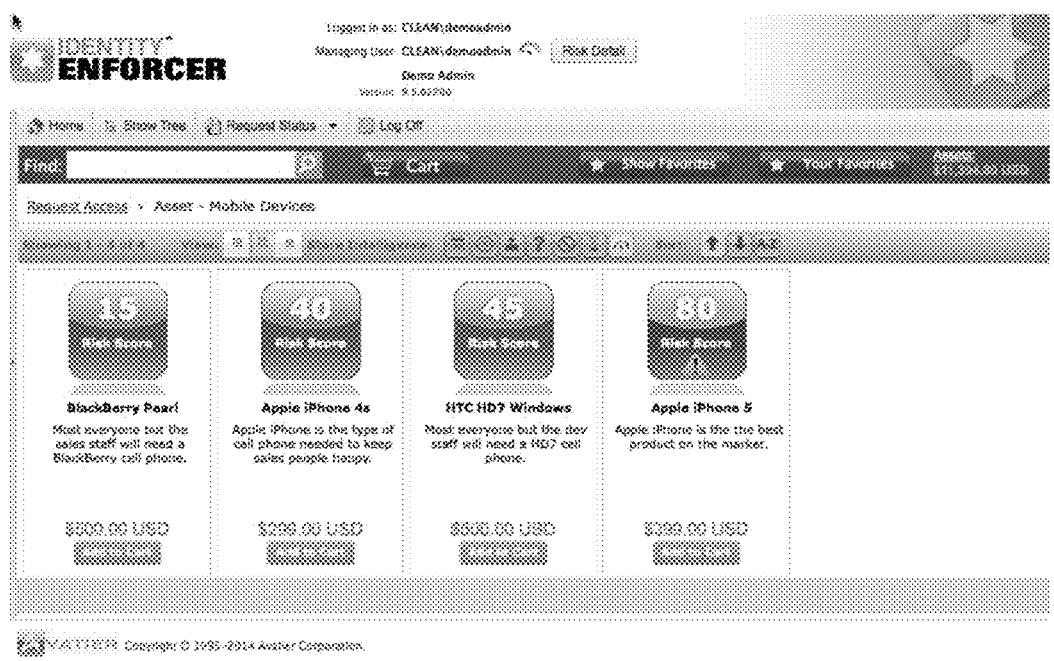
FIG. 8 is a screen shot showing the risk scores of the items, according to an embodiment of the invention.

An embodiment can be understood with reference to FIG. 8, which is a sample screen shot showing the various risk scores assigned to each item. The last item has a risk score of 80 and shows two visual indicators that the risk score is high: the icon color is red and the icon has a picture of an exclamation point, indicating the important of the risk score.

For example, it can be reported to a direct report that an employee has requested a particular item an inordinate number of times, e.g. greater than a threshold value, or requested an item that the employee is not approved to use. In this example, a high risk is associated to the user.

An embodiment may apply analytics and through such analytics allow an end user to determine that, with purchases or other requests, some items take longer to process, get through a particular process, etc.

In an embodiment, in-store analytics can be linked to, wholly or in part, social media applications. In an embodiment, this data can be exposed to whoever needs it, e.g. via a web service reporting component of a custom click report module. This exposing data process allows other systems to use the exposed data and perform actions if required. For example, a particular item may be configured to be linked to a social media application that provides consumer reviews of that particular product. For example, an end user may select a particular mobile device and further select a link to an online ratings application to determine whether that particular item is popular and/or whether any problems with the mobile device exist or are otherwise documented. For example, in an embodiment, particular products may be linked to or with Twitter, Facebook, or Yelp.

Persons of ordinary skill in the art will understand that apparatuses and methods in accordance with this invention may be practiced without the specific details.

An Example Machine Overview

Figure 9:
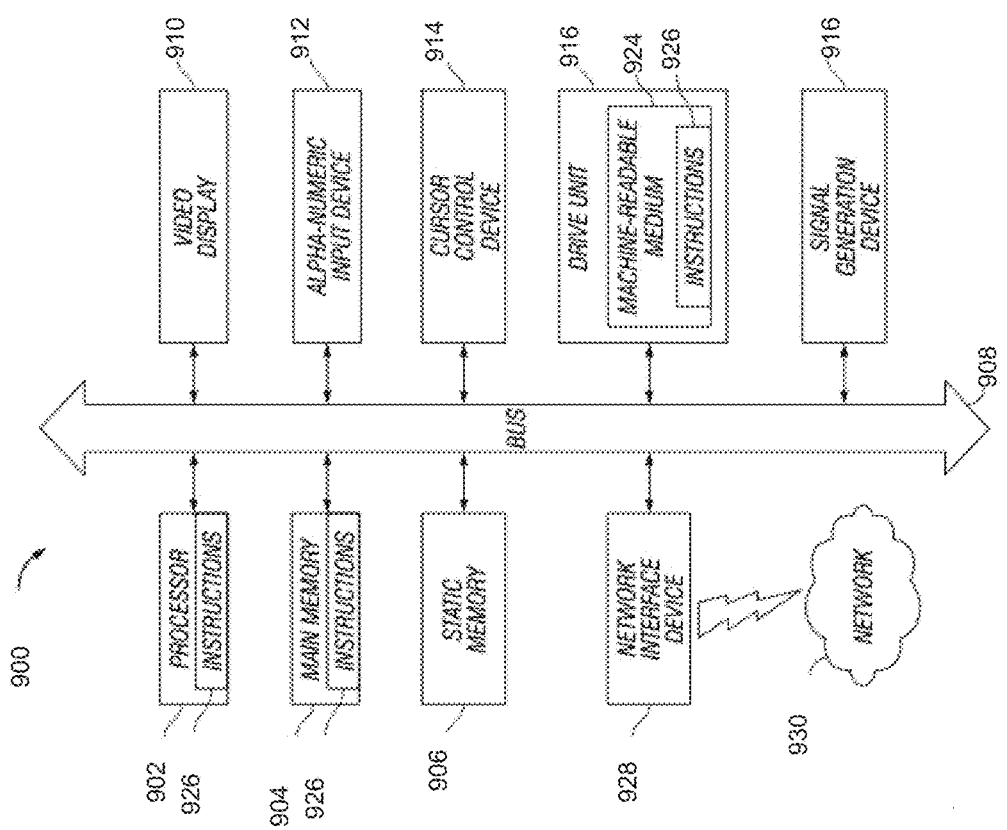
FIG. 9 is a block schematic diagram of a system in the exemplary form of a computer system according to an embodiment.

FIG. 9 is a block schematic diagram of a system in the exemplary form of a computer system 900 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 900 includes a processor 902, a main memory 904 and a static memory 906, which communicate with each other via a bus 908. The computer system 900 may further include a display unit 910, for example, a liquid crystal display (LCD) or a cathode ray tube (CRT). The computer system 900 also includes an alphanumeric input device 912, for example, a keyboard; a cursor control device 914, for example, a mouse; a disk drive unit 916, a signal generation device 918, for example, a speaker, and a network interface device 928.

The disk drive unit 916 includes a machine-readable medium 924 on which is stored a set of executable instructions, i.e. software, 926 embodying any one, or all, of the methodologies described herein below. The software 926 is also shown to reside, completely or at least partially, within the main memory 904 and/or within the processor 902. The software 926 may further be transmitted or received over a network 930 by means of a network interface device 928.

In contrast to the system 900 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to view in-store analytics or configure in-store analytics on such internet-enabled or other network-enabled devices, servers, or clients. It further should be appreciated that one or more cloud computing embodiments include in-store analytics or configuring in-store analytics using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented method for generating and providing one or more visual indicators, each reflecting generated analytics regarding target items to improve a user's experience in online shopping, managing, or monitoring the target item in an online store on a network, comprising:
   augmenting, by a back-end web system, a remote online store of a remote third party target site by providing a particularly designed browser extension, said extension configured to collect, cause to store on the back-end web system, and display target item data and statistics; and
   using, at least in part, the particularly designed browser extension, performing, by the back-end web system, the following steps:
      collecting, from the remote third party target site, data about a target item and storing on the back-end web system the collected data;
      receiving user input reflecting a mode and based on said mode, sorting the target item data using an end user GUI capability, wherein a mode is any of:
         the number of times the item has been issued;
         the number of times the item has been requested;
         the number of times a request for the item has been denied;
         the number of days the item has been in the store;
         the average time to complete a request for said item;
         the number of days since last requested;
      using said data and said selected mode, determining, by an analytics engine, the statistics about the target item;
      based on a configuration that gives weighting and ranges to the data, displaying the target item and the statistics on a display responsive to a request for viewing the target item, wherein the displayed target item is displayed with the one or more visual indicators, wherein a visual indicator indicates a particular importance about a particular statistic, wherein the visual indicator is configured to display:
         the number of times the item has been issued;
         the number of times the item has been requested;
         the number of times a request for the item has been denied;
         the number of days the item has been in the store;
         the average time to complete a request for said item;
         the number of days since last requested;
         who was the last requester;

when it was last requested;
the current assignment count;
the request count;
the denial count; and
the average number of request days;
providing drill-down capability via the display for presenting further detailed information about the target item;
responsive to a drill-down request, presenting the further detailed information about the target item; and
wherein the target item is a virtual or physical item that is be requested and assigned to one or more target users;
causing a configured programmed processor to perform, based on the statistics of the target item and associated rules:
automatically ordering more items that are of the same type as the target item;
automatically decreasing an order for more items that are of the same type as the target item; and
automatically removing the target item from the online store;
causing, GUI elements to be added to a user interface of the third party application via HTML, CSS, and JavaScript changes;
supplying on an on-going basis by the back end web system data to and from the remote third party application to the analytics engines and storage of the back-end web system;
using SQL to compute metrics from the supplied data, said metrics used in determining the statistics;
receiving user input causing a link on the visual indicator representing the target item to open a social media application, said user input passing target item identification information to cause the social media application to display consumer reviews of the target item; and
wherein the target item data and statistics are linked to social media applications via a web service reporting component of a custom click report module that is configured to expose the data and enable other systems to use the exposed data to perform actions; and
wherein one or more steps are performed on at least a processor coupled to at least a memory.

2. The method of claim 1, wherein the steps are configured to be performed automatically within a business organization and wherein the actions are automated processes based on the statistics regarding the target item.

3. The method of claim 1, wherein the target item is any of: stored assets; items available at the store; and representations of individual SAP accesses, Oracle accesses, or active directory accesses.

4. The method of claim 1, wherein the monitoring is used in auditing and compliance.

5. The method of claim 1, wherein the selectable modes are displayed as store analytic buttons on the display.

6. The method of claim 1, further comprising:
providing a configurable interface and application that allows a customer to configure the data, analytics, and display to suit their business needs by using a point click GUI web based configuration application.

7. The method of claim 1, wherein the indicators available are visual indicators for display to the end user and the configuration settings comprise:
Metric;
Type (Static, Percent);
Color Bands comprising red, yellow or green
Range End;
Default Sort comprising descending or ascending; and
Reverse.

8. The method of claim 1, wherein the indicators comprise:
an overlaid special icon; and
an audible indicator.

9. The method of claim 1, wherein the target item data and statistics are linked to social media applications via a web service reporting component of a custom click report module that exposes the data and allows other systems to use the exposed data to perform actions as required.

10. An apparatus for generating and providing one or more visual indicators, each reflecting generated analytics regarding target items to improve a user's experience in online shopping, managing, or monitoring the target item in an online store on a network, comprising:
at least one processor operable to execute computer program instructions;
at least one memory operable to store computer program instructions executable by the processor, for performing the steps of:
augmenting, by a back-end web system, a remote online store of a remote third party target site by providing a particularly designed browser extension, said extension configured to collect, cause to store on the back-end web system, and display target item data and statistics; and
using, at least in part, the particularly designed browser extension, performing, by the back-end web system, the following steps:
collecting, from the remote third party target site, data about a target item and storing on the back-end web system the collected data about a target item;
receiving user input reflecting a mode and based on said mode, sorting the target item data using an end user GUI capability, wherein a mode is any of:
the number of times the item has been issued;
the number of times the item has been requested;
the number of times a request for the item has been denied;
the number of days the item has been in the store;
the average time to complete a request for said item;
the number of days since last requested;
using said data and said selected mode, determining, by an analytics engine, the statistics about the target item;
based on a configuration that gives weighting and ranges to the data, displaying the target item and the statistics on a display responsive to a request for viewing the target item, wherein the displayed target item is displayed with the one or more visual indicators, wherein a visual indicator indicates a particular importance about a particular statistic, wherein the visual indicator is configured to display:
the number of times the item has been issued;
the number of times the item has been requested;
the number of times a request for the item has been denied;
the number of days the item has been in the store;
the average time to complete a request for said item;
the number of days since last requested;

who was the last requester;
when it was last requested;
the current assignment count;
the request count;
the denial count; and
the number of average request days;
providing drill-down capability via the display for presenting further detailed information about the target item;
responsive to a drill-down request, presenting the further detailed information about the target item; and
wherein the target item is a virtual or physical item that is be requested and assigned to one or more target users;
causing a configured programmed processor to perform, based on the statistics of the target item and associated rules:
automatically ordering more items that are of the same type as the target item;
automatically decreasing an order for more items that are of the same type as the target item; and
automatically removing the target item from the online store;
causing, GUI elements to be added to a user interface of the third party application via HTML, CSS, and JavaScript changes;
supplying on an on-going basis by the back end web system data to and from the remote third party application to the analytics engines and storage of the back-end web system;
using SQL to compute metrics from the supplied data, said metrics used in determining the statistics;
receiving user input causing a link on the visual indicator representing the target item to open a social media application, said user input passing target item identification information to cause the social media application to display consumer reviews of the target item; and
wherein the target item data and statistics are linked to social media applications via a web service reporting component of a custom click report module that is configured to expose the data and enable other systems to use the exposed data to perform actions.

11. A non-transitory computer readable medium having stored thereon a computer program for generating and providing one or more visual indicators, each reflecting generated analytics regarding target items to improve a user's experience in online shopping, managing, or monitoring the target item in an online store on a network, said computer program comprising a program code which, when executed by a processor, performs:
augmenting, by a back-end web system, a remote online store of a remote third party target site by providing a particularly designed browser extension, said extension configured to collect, cause to store on the back-end web system, and display target item data and statistics; and
using, at least in part, the particularly designed browser extension, performing, by the back-end web system, the following steps:
collecting, from the remote third party target site, data about a target item and storing on the back-end web system the collected data;
receiving user input reflecting a mode and based on said mode, sorting the target item data using an end user GUI capability, wherein a mode is any of:
the number of times the item has been issued;
the number of times the item has been requested;
the number of times a request for the item has been denied;
the number of days the item has been in the store;
the average time to complete a request for said item;
the number of days since last requested;
using said data and said selected mode, determining, by an analytics engine, the statistics about the target item;
based on a configuration that gives weighting and ranges to the data, displaying the target item and the statistics on a display responsive to a request for viewing the target item, wherein the displayed target item is displayed with the one or more visual indicators, wherein a visual indicator indicates a particular importance about a particular statistic, wherein the visual indicator is configured to display:
the number of times the item has been issued;
the number of times the item has been requested;
the number of times a request for the item has been denied;
the number of days the item has been in the store;
the average time to complete a request for said item;
the number of days since last requested;
who was the last requester;
when it was last requested;
the current assignment count;
the request count;
the denial count; and
the average number of request days;
providing drill-down capability via the display for presenting further detailed information about the target item;
responsive to a drill-down request, presenting the further detailed information about the target item; and
wherein the target item is a virtual or physical item that is be requested and assigned to one or more target users;
causing a configured programmed processor to perform, based on the statistics of the target item and associated rules:
automatically ordering more items that are of the same type as the target item;
automatically decreasing an order for more items that are of the same type as the target item; and
automatically removing the target item from the online store;
causing, GUI elements to be added to a user interface of the third party application via HTML, CSS, and JavaScript changes;
supplying on an on-going basis by the back end web system data to and from the remote third party application to the analytics engines and storage of the back-end web system;
using SQL to compute metrics from the supplied data, said metrics used in determining the statistics;
receiving user input causing a link on the visual indicator representing the target item to open a social media application, said user input passing target item identification information to cause the social media application to display consumer reviews of the target item; and wherein the target item data and statistics are linked to social media applications via a web service reporting component of a custom click report module that is configured to expose the data and enable other systems to use the exposed data to perform actions.

* * * * *